(12) United States Patent
Santangeli et al.

(10) Patent No.: US 11,375,839 B2
(45) Date of Patent: Jul. 5, 2022

(54) PARCEL LOCKER SYSTEM WITH AUTONOMOUS CLUSTERS OF COMPARTMENTS

(71) Applicant: QUADIENT TECHNOLOGIES FRANCE, Bagneux (FR)

(72) Inventors: Gabriel Santangeli, Savigny-sur-Orge (FR); Thomas Eraud, Avignon (FR); Arnaud Yvoz, Taillades (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 163 days.

(21) Appl. No.: 16/717,595

(22) Filed: Dec. 17, 2019

(65) Prior Publication Data

US 2020/0187694 A1   Jun. 18, 2020

(30) Foreign Application Priority Data

Dec. 18, 2018 (EP) ..................................... 18306730

(51) Int. Cl.
| | |
|---|---|
| *A47G 29/14* | (2006.01) |
| *A47G 29/20* | (2006.01) |
| *G07C 9/00* | (2020.01) |

(52) U.S. Cl.
CPC .......... *A47G 29/141* (2013.01); *A47G 29/20* (2013.01); *G07C 9/00309* (2013.01);
(Continued)

(58) Field of Classification Search
None
See application file for complete search history.

(56) References Cited

U.S. PATENT DOCUMENTS

| 10,424,143 B2 * | 9/2019 | Miller ................ G07C 9/00912 |
| 2008/0246587 A1 | 10/2008 | Fisher |

(Continued)

FOREIGN PATENT DOCUMENTS

| EP | 3306577 A1 | 4/2018 |
| WO | 2017163018 A2 | 9/2017 |

OTHER PUBLICATIONS

Extended European search report for European Application No. 18306730.5, dated Jun. 11, 2019, 10 pages.

*Primary Examiner* — Carlos Garcia
(74) *Attorney, Agent, or Firm* — Cozen O'Connor

(57) ABSTRACT

An electronic locker system for parcel deposit and pick-up, comprising: a remote shipping system, a long distance communication network, at least one mobile device communicating via the long distance communication network with the remote shipping system, at least one parcel locker constituted of at least one autonomous compartments cluster including at least one compartment equipped with a door and including a locking module, which electronically controls locking and unlocking of the door and which establishes a local communication with the at least one mobile device via a short distance communication, wherein the locking module comprises: an energy management module configured for managing transitions of energy modes and allowing the at least one autonomous compartments cluster to be run in a deep sleep mode or in a sleep mode and regularly allowing a wake-up from said deep sleep mode to said sleep mode, a radio transceiver module equipped with an antenna, and at least one processor running a firmware configured for, while in the sleep mode, regularly emitting with the radio transceiver module a broadcasted short message towards the at least one mobile device.

11 Claims, 5 Drawing Sheets

(52) U.S. Cl.
CPC .... *G07C 9/00896* (2013.01); *A47G 2029/145* (2013.01); *A47G 2029/146* (2013.01); *A47G 2029/149* (2013.01); *G07C 2009/0092* (2013.01); *G07C 2009/00373* (2013.01)

(56) References Cited

U.S. PATENT DOCUMENTS

| | | | |
|---|---|---|---|
| 2013/0200725 A1* | 8/2013 | Apelker | G05B 11/01 323/318 |
| 2014/0014008 A1* | 1/2014 | Tompkins | E05G 1/02 109/23 |
| 2017/0177406 A1* | 6/2017 | Chen | G06F 11/3442 |
| 2018/0338285 A1* | 11/2018 | Chung | H04W 40/24 |
| 2018/0348843 A1* | 12/2018 | de Cesare | H04W 52/0229 |
| 2018/0348844 A1* | 12/2018 | Lingutla | G06F 1/3231 |
| 2018/0348849 A1* | 12/2018 | Lingutla | G06F 1/3296 |
| 2019/0102962 A1* | 4/2019 | Miller | G07F 17/12 |
| 2020/0187694 A1* | 6/2020 | Santangeli | A47G 29/20 |
| 2020/0193373 A1* | 6/2020 | Varman | G06Q 50/32 |
| 2020/0193375 A1* | 6/2020 | Santangeli | H04L 63/101 |
| 2020/0221754 A1* | 7/2020 | Santana | A23P 20/20 |
| 2020/0258035 A1* | 8/2020 | Fujisawa | G06Q 10/0833 |

* cited by examiner

PARCEL LOCKER SYSTEM WITH AUTONOMOUS CLUSTERS OF COMPARTMENTS

FIELD OF THE INVENTION

The present invention relates to a system and methods for depositing shipments by a delivery agent, into electronic parcel lockers constituted of lockable compartments, and for picking-up these shipments thereafter.

PRIOR ART—BACKGROUND OF THE INVENTION

Electronic parcel locker systems are used for dropping-off, storing and picking up various kinds of shipments such as parcels or packages. These parcel locker systems typically are used by carrier agents for depositing shipments, which are then picked-up from the parcel locker by recipients. Electronic parcel lockers have a user interface for the carrier agent or the recipient to operate the parcel locker, which is used for depositing the shipment in the case of the carrier agent or for picking-up the shipment in the case of the recipient. This interface allows the user to enter information for operating the parcel locker and allows the parcel locker to provide information back to the user. For recent electronic parcel lockers, this functionality typically is fulfilled by a touchscreen. This user interface also is used to capture information attached to the shipment or to some user identification means. This functionality can be fulfilled by barcode readers reading printed barcodes or other technologies such as radio-frequency communication for reading RFID tags or near field communication. Electronic parcel locker systems generally comprise a network of parcel lockers, all communicating directly with a remote shipping system in charge of managing the network of parcel lockers, and eventually also managing data exchanges with the carrier information systems. The communication between each parcel locker and the remote shipping system is performed by long distance communication technologies such as 3G-4G or GSM.

FIG. 5 describes a prior art electronic parcel locker system, which comprises an electronic parcel locker 10 communicating via a long distance communication network 20 with a remote shipping system 25, which generates authorization codes for accessing the electronic parcel locker and communicates these codes directly to the electronic parcel locker and manages data regarding the shipments handled by the electronic parcel locker. The electronic parcel locker comprises a series of compartments 30i with different sizes and equipped with an electronically controlled door. The electronic parcel locker operation, and in particular the opening and closing of the compartment doors, is controlled by a central control unit 32. This central control unit 32 controls the communication with the remote shipping system 25 and the parcel locker user interface, which typically includes a touchscreen 34 and a barcode reader 36. When a carrier agent comes for depositing parcels into the electronic parcel locker 10, the identification 38 of each parcel 40 must be captured by the electronic parcel locker and is associated by the central control unit with the compartment where it is deposited. For tracking purposes, the identification 38 may be in the form of a barcode label affixed onto each parcel 40. Generally, compartments have a standard width and are assembled vertically into columns 42.

Such prior art electronic parcel locker systems have the following characteristics, which can become problematic as explained further below. The electronic parcel locker communicates directly with the remote shipping system for transferring local data including events occurring within the electronic parcel locker, compartments status or data captured by the electronic parcel locker such as the parcel identifications. Additionally, prior art electronic parcel locker are costly for manufacturing plant and complex for transportation and installation due to their volume.

Prior art electronic parcel locker systems and their associated architecture have several issues. An electrical power connection is required, which can often be difficult to set up. The need for long distance communication with the server or servers of the remote shipping system imposes either the installation of a physical communication cable connecting the electronic parcel locker to the long distance communication network or imposes the usage of a wireless long distance communication system. In the case of wireless long distance communication, an additional issue is that it does not operate everywhere. In particular, electronic parcel lockers cannot be straightly installed in underground locations where wireless long distance communication does not propagate. Another issue is the complexity and cost involved with prior art electronic parcel lockers requiring expert competency. An electronic parcel locker is assembled in a manufacturing plant and can be shipped as a complete unit to the installation location. However, as a complete unit can be quite voluminous, vertical columns of compartments are typically pre-assembled and partially pre-wired in a manufacturing plant and the columns are shipped separately to the installation location. Expert competency is required for connecting the columns both mechanically and electrically, and for starting the system. Their lack of modularity does not allow for easily swapping compartments or for easily upgrading or changing their configuration on site. Overall, prior art electronic parcel lockers are expensive systems, involving costly transportation and installation and servicing.

So there is a need for a new generation of parcel lockers allowing for cost reduction and more flexibility, including in particular compartment swaps.

OBJECT AND DEFINITION OF THE INVENTION

The object of the invention consists in providing a parcel locker system with some autonomous compartments clusters and therefore overcoming the above drawbacks.

This object is achieved by providing an electronic locker system for parcel deposit and pick-up, comprising: a remote shipping system, a long distance communication network, at least one mobile device communicating via the long distance communication network with the remote shipping system, at least one parcel locker constituted of at least one autonomous compartments cluster including at least one compartment equipped with a door and including a locking module, which electronically controls locking and unlocking of the door and which establishes a local communication with the at least one mobile device via a short distance communication, characterized in that the locking module comprises: an energy management module configured for managing transitions of energy modes and allowing the at least one compartment to be run in a deep sleep mode or in a sleep mode and regularly allowing a wake-up of allowing from said deep sleep mode to said sleep mode, a radio transceiver module equipped with an antenna, and a processor running a firmware configured for, while in the sleep mode, regularly emitting with the radio transceiver module a broadcasted short message towards the at least one mobile device. Such an architecture avoids the cost of implementing a central controller and a user interface and a long distance communication system in a parcel locker.

Also, the locking module comprises a low energy sleep timer for triggering transitions from said deep sleep mode to said sleep mode and a listening time window timer for triggering an end of said sleep mode and a return to said deep sleep mode and said at least one processor comprises a high energy processor module, a low energy processor module and a very low energy processor module.

According to a feature of the invention, several of the at least one compartments cluster are mechanically fastened together to form a column, and preferably several of the columns of the at least one autonomous compartments clusters are mechanically fastened together to form the at least one parcel locker, therefore allowing for simple installation and configuration upgrade and servicing, including compartments cluster swaps, so that a site owner hosting a new generation parcel locker can install, upgrade and service this new generation parcel locker without the intervention of an expert technician.

According to another feature of the invention, the broadcasted short message comprises a first unique cluster identification and status information relative to the at least one autonomous compartments cluster wherein the at least one mobile device is configured for checking on the status information in order to avoid unnecessary communication or initiating compromising actions with the at least one autonomous compartments cluster.

In a particular embodiment, the status information comprises an events limit or a compartment state or a low power status wherein the at least one mobile device is configured for checking on whether a limit of events stored in the locking module has been reached and for checking on the compartment state for establishing whether the at least one compartment is empty or full before initiating a deposit in the at least one compartment and for checking on the low power status before initiating a communication with the at least one autonomous compartments cluster.

In a preferred embodiment, a request from the at least one mobile device for establishing a local communication with the at least one autonomous compartments cluster via the short distance communication includes an authenticator comprising or sent with a second unique cluster identification wherein the firmware is configured for checking for a match between the first unique cluster identification stored in the locking module and the second unique cluster identification. Preferably, the authenticator is unique. Advantageously, the authenticator comprises a compartment index wherein the firmware is configured for associating the compartment index with the at least one compartment.

In another embodiment, the locking module includes a non-volatile memory storing a functions table comprising functions available for the at least one autonomous compartments cluster and which can be run by the processor, and advantageously the authenticator includes a privileges mask identifying functions authorized for operating the at least one autonomous compartments cluster amongst functions within the functions table, where preferably the privileges mask consists in a series of bits wherein a bit of the series of bits corresponds to a function of the functions table and a value of the bit indicates whether the function is authorized or not authorized.

In a particular embodiment, the the firmware is configured for emitting the broadcasted short message with a repetition time period of 250 ms within a range +/−100 ms, with a listening time window of 10 ms within a range +20 ms/−0 ms, with a number of channels of two (2) or of three (3) preferably, and with a power emission parameter of 0 dBm within a range +4 dBm/−0 dBm.

According to a feature of the invention, the remote shipping system is configured for receiving and storing credentials of a user of the at least one parcel locker and for generating the authenticator and for generating the privileges mask based on the credentials of the user.

In a preferred embodiment, the remote shipping system comprises a database configured for storing a parcel locker configuration associated with the at least one parcel locker including: the second unique cluster identification associated with the at least one autonomous compartments cluster, a unique parcel identification, a cluster broadcasting table, and a cluster status table; wherein the at least one mobile device is configured for receiving the parcel locker configuration from the remote shipping system in order to operate the at least one parcel locker.

Advantageously, the cluster status table includes a status of the door and a status of said at least one compartment including whether said at least one compartment is locked or unlocked or whether the at least one compartment is damaged or operational or whether the at least one compartment is clean or dirtied.

According to another feature of the invention, the cluster broadcasting table includes the repetition time period parameter, the listening time window parameter, the number of channels and the power emission parameter wherein the at least one mobile device is configured for receiving the cluster broadcasting table and transferring the cluster broadcasting table to the at least one autonomous compartment.

In another embodiment, the non-volatile memory of the locking module stores the first unique cluster identification, a low power status, an events limit indicating whether a limit for events stored in the locking module has been reached, and compartments data comprising an events table wherein the firmware is configured for communicating the compartments data via the at least one mobile device to the remote shipping server.

In a particular embodiment, the locking module comprises a lock interface and an authorization code uniquely associated with the unique parcel identification corresponding to a parcel deposited in the at least one compartment so that a parcel recipient without a mobile device may pick-up a parcel by entering the authorization code via the lock interface wherein the remote shipping server is configured for generating and storing the authorization code and for transmitting the authorization code to the locking module via the mobile device.

In another particular embodiment, the at least one mobile device is fixedly mounted next to the at least one parcel locker or directly onto the at least one parcel locker and, preferably, connected to a local electrical network.

The invention also concerns a method for operating at least one parcel locker constituted of at least one autonomous compartments cluster including at least one compartment and including a locking module, via at least one mobile device communicating via a long distance communication network with a remote shipping system, wherein said at least one autonomous compartments cluster comprises an energy management module configured for managing transitions of energy modes and allowing said at least one autonomous compartments cluster to be run in a deep sleep mode or in a sleep mode and regularly allowing a wake-up from said deep sleep mode to said sleep mode; the method comprising: establishing a communication between the at least one mobile device and the remote shipping system, regularly emitting by the locking module, while in the sleep mode, a broadcasted short message with a radio transceiver module addressed to mobile devices, wherein the broadcasted short message includes a first unique cluster identification stored in the locking module and identifying the at least one autonomous compartment, receiving by the at least one mobile device from the remote shipping system a authenticator used for establishing a short distance communication by the at least one mobile device with the at least one autonomous compartment, storing by the locking module events occurring relatively to the operation of the at least one autonomous compartments cluster in an events table, and transferring the events stored by the locking module to the remote shipping server via the at least one mobile device.

Preferably, the authenticator is unique.

In a preferred embodiment, the at least one mobile device requests from the remote shipping system the authenticator for establishing a communication with the at least one autonomous compartments cluster after capturing a first the broadcasted short message including the first unique cluster identification and the remote shipping system identifies the at least one parcel locker based on the first unique cluster identification received from the at least one mobile device.

In a particular embodiment, the authenticator is generated by the remote shipping system and includes or is sent with a second unique cluster identification and comprises a compartment index wherein the firmware is configured for associating the compartment index with the at least one compartment, and advantageously, for establishing a communication or for authorizing an access, the at least one autonomous compartments cluster validates the authenticator received from the at least one mobile device and compares the second unique cluster identification with the first unique cluster identification stored in the locking module.

According to a feature of the invention, the authenticator includes a privileges mask generated by the remote shipping system based on credentials of a user of the at least one parcel locker and wherein the at least one autonomous compartments cluster uses the privileges mask for validating access to functions, which are authorized for the user, and preferably, the at least one autonomous compartments cluster identifies a function targeted by the request within a functions table and checks whether the function is authorized by the privileges mask.

According to another feature of the invention, the locking module stores an events limit indicating whether a limit for events stored in the locking module has been reached and updates the events limit following on a transferring events stored by the locking module to the remote shipping server.

In another embodiment, the broadcasted short message comprises an events limit indicating whether a limit for events stored in the locking module has been reached and wherein the at least one mobile device checks on the events limit for establishing whether a connection with the locking module is required for transferring events stored by the at least one autonomous compartments cluster to the remote shipping system.

According to a feature of the invention, the broadcasted short message is emitted according to parameters of a cluster broadcasting table stored in the locking module, and preferably, the cluster broadcasting table is downloaded from the remote shipping server, and advantageously, the parameters of the cluster broadcasting table are adjusted via a wizard sub-program installed on the at least one mobile device.

According to another feature of the invention, the at least one mobile device is used as part of a network of mobile devices for establishing an asynchronous bidirectional multi-channel communication between the remote shipping system and the at least one autonomous compartments cluster of the at least one parcel locker, and advantageously the remote shipping server selects preferred mobile devices according to preset rules for addressing a message to the at least one autonomous compartment, wherein preferably one of the preset rules is that the message is addressed to the preferred mobile devices, which are making requests to the remote shipping system regarding the at least one autonomous compartment, therefore, allowing for parcel lockers to be operated in areas not covered by long distance wireless communication.

According to a feature of the invention, the at least one mobile device is used as a user interface for operating the at least one autonomous compartments cluster of the at least one parcel locker.

According to another feature of the invention, a program installed on the at least one mobile device is instantiated according to a user category.

In a preferred embodiment, the shipping remote server provides a parcel locker configuration to the at least one mobile device for the at least one mobile device to operate the at least one parcel locker, and preferably the remote shipping server identifies the parcel locker configuration for download to the at least one mobile device based on the first unique cluster identification comprised in the broadcasted short message and transferred to the remote shipping server by the at least one mobile device.

According to a feature of the invention, the at least one autonomous compartments cluster establishes, based on the parcel locker configuration, the number of compartments, which constitute the at least one parcel locker, and checks that a broadcasted short message is received from all of the at least one autonomous compartments cluster of the at least one parcel locker, wherein advantageously the parcel locker configuration is received from the remote shipping server before the user arrives near the at least one parcel locker so that a parcel deposit can start before a broadcasted short message is received by the at least one mobile device from the at least one parcel locker, and therefore, allowing for parcel lockers to be operated in areas not covered by long distance wireless communication.

In a particular embodiment, the at least one mobile device captures a parcel identification attached to a parcel to be deposited in the at least one parcel locker and the at least one mobile device, based on the parcel locker configuration, selects a compartment for deposit according to preset rules, wherein preferably the preset rules include a selected compartment is empty and a size of the selected compartment matches a size of a parcel for deposit or a rotation amongst autonomous compartments for ensuring a homogeneous usage of autonomous compartments in order to apportion power consumption or to prevent early wear.

According to another feature of the invention, after capturing the parcel identification attached to the parcel to be deposited, the at least one mobile device checks for a match between the parcel identification and a list of identifications of parcels for deposit, and preferably the list of identifications is provided by the remote shipping system to the at least one mobile device.

In a particular embodiment, the method further comprises: sending a request by the at least one mobile to the at least one autonomous compartments cluster for unlocking, wherein the request includes the authenticator, unlocking by the at least one autonomous compartments cluster after authorizing the request, and locking by the at least one autonomous compartments cluster after deposit of the parcel, and advantageously the locking module activates a visual indicator for indicating which door should be opened for parcel deposit.

In another embodiment, after transfer of events stored by the locking module to the remote shipping server via the at least one mobile device, the remote shipping system generates a notification regarding the parcel deposited in the at least one compartment and including information for picking-up the parcel.

In a particular embodiment, when a parcel is due for deposit in the at least one compartment, the at least one mobile device receives from the remote shipping server an authorization code, which is generated by the remote shipping server, and transfers the authorization code to the at least one autonomous compartments cluster so that a parcel recipient without a mobile device may pick-up the parcel by entering the authorization code via a lock interface, wherein preferably the authorization code is unique and uniquely associated with a unique parcel identification of the parcel, and advantageously the authorization code is a one-time code, which can be used only once by a parcel recipient.

According to a feature of the invention, the authorization code is requested by the at least one mobile device at the time of deposit of the parcel after the parcel for deposit has been identified.

According to another feature of the invention, the authorization code is generated and communicated by the remote shipping server to the at least one mobile device for temporary storage before or when a carrier agent plans for a daily delivery into the at least one parcel locker, therefore, allowing for parcel lockers to be operated in areas not covered by long distance wireless communication.

Advantageously, the information in the notification for picking-up the parcel comprises the authorization code and a location of the at least one parcel locker and the parcel identification and a compartment identifier corresponding to a physical identifier attached on a visible part of the at least one compartment.

In another embodiment, the notification received by the at least one mobile device comprises the parcel identification and includes a functionality designed for transferring the authenticator to the at least one mobile device.

In a particular embodiment, the method further comprises: activating the functionality and transferring the parcel identification to the at least one mobile device, accessing a web application hosted in the remote shipping system, having, via the web application, the at least one mobile device requesting from the remote shipping system the authenticator for picking-up a parcel, transferring the parcel identification to the remote shipping system from the at least one mobile device, identifying by the remote shipping system the at least one parcel locker and the at least one autonomous compartments cluster based on the parcel identification, generating by the remote shipping system the authenticator, which is uniquely associated with the at least one compartment and which includes or is sent with a second unique cluster identification retrieved stored in the remote shipping system, and transferring the authenticator to the at least one mobile device.

Preferably, data including the authenticator are encapsulated within the functionality and, when the functionality is activated, data are transferred to the at least one mobile device.

In another embodiment, the method further comprises for automatic unlock: capturing by the at least one mobile device the broadcasted short messages emitted by the at least one autonomous compartment, wherein the broadcasted short message includes the unique cluster identification, checking by the at least one mobile device for a match between the second unique cluster identification received from the remote shipping system and the first unique cluster identification received from the at least one autonomous compartments cluster for identifying which autonomous compartments cluster contains the recipient's parcel, sending, in case of match, by the at least one mobile device a response message to the at least one autonomous compartments cluster for establishing a communication so that the response message can be captured within a limited listening time window of the at least one autonomous compartments cluster, wherein the response message includes the authenticator provided by the remote shipping server, validating by the at least one autonomous compartments cluster the authenticator for establishing a communication with the at least one mobile device, sending by the at least one mobile device a request for the at least one autonomous compartments cluster to unlock the at least one compartment, and unlocking by the at least one autonomous compartments cluster for parcel pick-up.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

Figure 1:
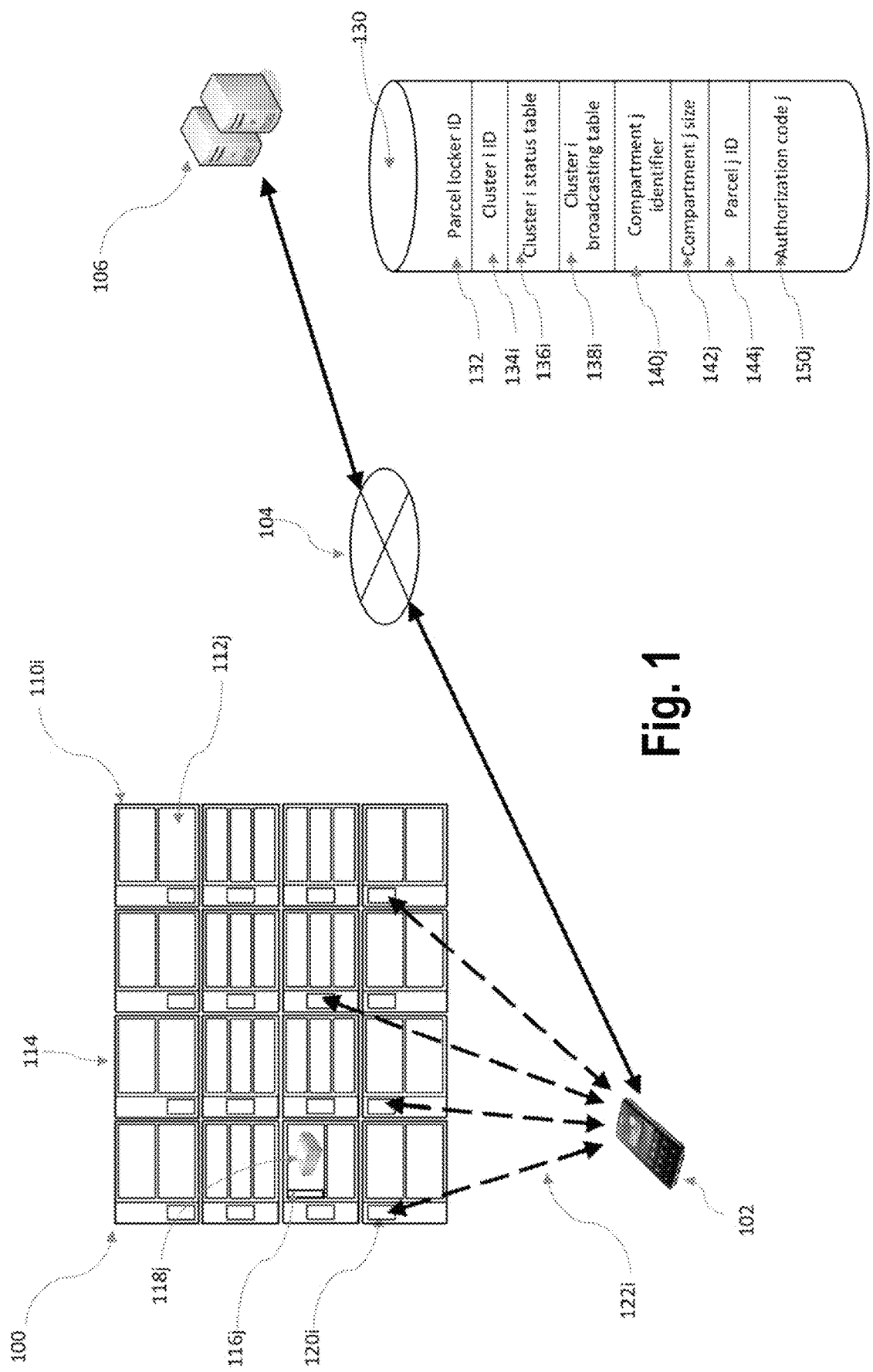
FIG. 1 represents an architecture of a parcel locker system according to an embodiment of the invention.

According to the invention, in order to avoid the necessity for power connection and for long distance communication and to allow for simple installation and configuration upgrade, autonomous clusters of compartments interacting locally with mobile devices via short distance wireless communication are disclosed. FIG. 1 illustrates an embodiment of a parcel locker system of the invention comprising a parcel locker 100, a mobile device 102 communicating via a long distance communication network 104 based on a technologies such as 3G-4G or GSM with a remote shipping system 106, which manages authorization access to the parcel locker 100 and manages data regarding the shipments handled by the parcel locker 100. The parcel locker 100 is constituted of autonomous compartments clusters 110*i*, which may comprise several compartments 112*j*. So as to be easily handled during installation on site or for swapping deficient components, such compartment clusters typically comprise two or three compartments, or eventually only one large compartment. The compartment clusters can be piled up and mechanically fastened together to form a column 114. An autonomous compartments cluster is characterized by a design without any power connection or long distance communication, allowing for simple installation and configuration upgrade and servicing. The compartments 112j and the autonomous compartments clusters 110i, having a same width, may have different heights to cope for best matching with different parcel sizes. The columns 114 can then be mechanically fastened together to form a larger parcel locker unit. Each compartment 112j is equipped on the front with a hinged door 116j, which when opened allows for depositing in the compartment or retrieving from the compartment a parcel 118j. Each autonomous compartments cluster 110i comprises a communicating locking module 120i, which electronically controls the locking and unlocking of each door of the compartments of the cluster. Each locking module 120i can establish a local communication with a nearby mobile device 102 via a short distance communication 122i, such as WIFI, IR or Bluetooth.

The remote shipping system comprises a database system 130, which may include several databases eventually installed on several server systems operated by shipping carriers or by a service company owning or managing a parcel locker park. The database system 130 stores configurations of all the parcel lockers 100 to be controlled by the remote shipping system. Each parcel locker configuration (PL configuration) includes a unique parcel locker identification 132, and for each compartments cluster 110i of the parcel locker, a unique cluster identification 134i. The PL configuration also includes for each compartments cluster a cluster status table 136i including a level of the remaining energy for the compartments cluster and a cluster broadcasting table 138i comprising a repetition time period parameter, a listening time window parameter and a power emission parameter, which correspond to optimized parameters for the locking module to broadcast short messages towards mobile devices. The cluster status table also includes for each compartment of the compartments cluster: a compartment identification, a status of the lock (locked/unlocked), a status of the door (opened/closed), whether the compartment is damaged or operational, or whether the compartment is clean or dirtied. Each compartment of the compartments cluster may be identified by a compartment index indexing the compartment amongst the compartments of the compartments cluster. The association of a unique cluster identification and of a compartment index allows for a unique identification of the compartment (unique compartment identification). In addition, the PL configuration includes for each compartment 112j: a compartment identifier 140j that is replicated on the compartments cluster as a visual identifier for the user, a compartment size 142j, and an unique parcel identification 144j, if a parcel is deposited in the compartment 112j.

The database system 130 also stores credentials of the parcel lockers users and information for communicating with them such as phone numbers and email addresses. In particular, the database system 130 stores for each parcel recipient a unique authorization code 150j, which is generated by the remote shipping system for each parcel deposited in a compartment and which may be required for the parcel recipient to pick-up his parcel. This unique authorization code 150j is associated with the recipient credentials and uniquely associated with the parcel identification 144j of the corresponding parcel.

The mobile device 102 can be a smartphone or personal digital assistant (PDA) or any computerized mobile device having some short distance communication capabilities compatible with the short distance communication capabilities of the locking modules and having some long distance communication capabilities compatible with the long distance communication capabilities of the remote shipping system 106. According to the invention, the mobile devices are used as user interfaces for operating the compartments of the parcel locker, replacing the central user interfaces of prior art parcels lockers, which therefore are not required on the parcel locker of the invention. In particular, an authorization code for accessing a compartment by a parcel recipient can be communicated to the locking module via the mobile device of the recipient, and therefore is not required to be entered via a user interface like on the prior art parcel lockers. More generally, the mobile devices are used as a channel for communication between the remote shipping system and the locking modules of the parcel lockers allowing the establishment of an asynchronous bidirectional multi-channel communication. As a result, the remote shipping server may for example transfer via any mobile device an instruction for blocking the operation of a compartment or a locking module of a compartments cluster may transfer via any mobile device information such as events regarding operations within compartments of the compartments cluster to the remote shipping system.

Different categories of users can interact with the compartments of the parcel locker via their mobile device including parcel recipients or site owners or carrier agents, who typically may use a PDA. Preferably, the mobile devices shall be smartphones, in particular in the case of the parcel recipients, so that they can use their personal smartphones. A mobile parcel locker application (MPL application) for operating locally the parcel locker compartments may be installed on the mobile devices and preferably may be downloaded from a remote server, for example via an application store. This MPL application includes sub-programs for installing or servicing the parcel locker, typically for site owners, or for delivering parcels, typically for carrier agents, or for picking-up parcels or for receiving notifications, typically for the parcel recipients. Preferably, the MPL application is instantiated according to the user category. In the case of a carrier agent PDA, the MPL application may be integrated in the carrier agent software module installed on his PDA for delivering parcels.

The usage of autonomous compartments clusters provides easiness and flexibility, in particular as it avoids the need for any electrical wiring around the compartments clusters or for any electrical power connection. However, there is a major requirement for minimizing the power consumption of each compartments cluster, and therefore there is the need for the locking modules for minimizing communication and data exchanges, which are significant source of energy consumption. One way for minimizing the power consumption is to implement low energy modes or sleep modes for the operation of the locking modules. In parallel, there is a need for optimizing usability of the parcel locker including in particular ensuring that the user does not have to carry out any specific action for waking-up a locking module such as touching a button on the parcel locker, or ensuring that the user does not have to wait for too long a time in front of the parcel locker for example due to long data exchanges, or ensuring that data stored in a locking module of a compartments cluster can be easily updated. All these aspects are addressed by the invention as described below.

Figure 2:
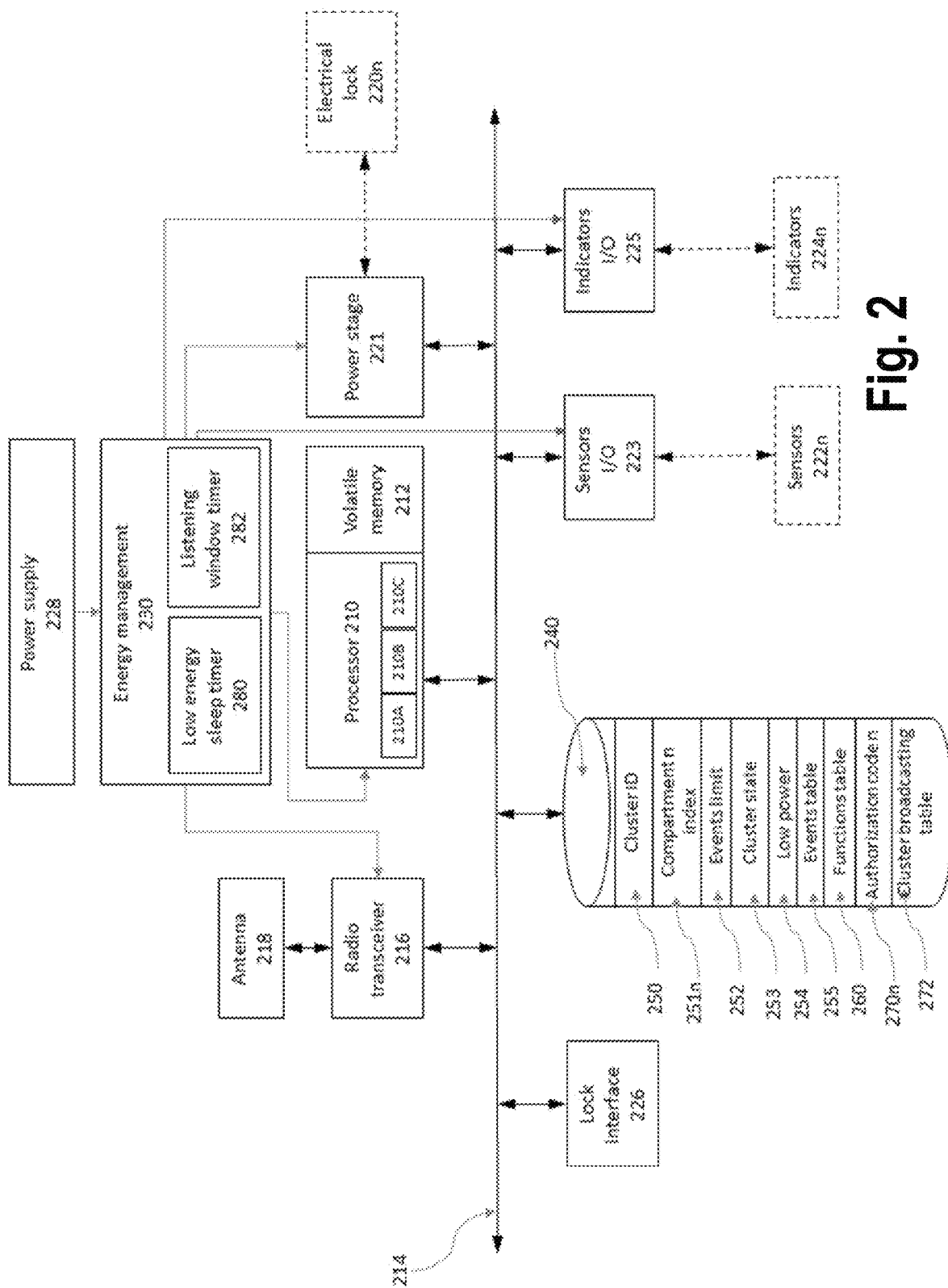
FIG. 2 illustrates an architecture of a locking module according to an embodiment of the invention.

FIG. 2 illustrates a locking module 120*i* of a compartments cluster 110*i*, which comprises a processor or a group of processors 210 and associated volatile memory 212 controlling the major components of the locking module via a bus 214 or via direct control lines. The short distance wireless communication is carried out by a radio transceiver module 216 equipped with an antenna 218. The radio transceiver module may include some registers or may have access to dedicated registers within the locking module memories. These registers dedicated to the radio transceiver module include setting data for the operation of the radio transceiver module and the antenna and data relative to initial messages or broadcasting short messages sent by the locking module for initiating communication with a mobile device or several mobile devices. The door of each compartment of the compartments cluster is equipped with an electrical lock 220*n*. The door fastening of the electrical locks is performed via a power stage 221, which in particular provides the power for the electrical locks under the control of the processor 210, and is directly controlled by the processor 210. Sensors 222*n* may be provided for each compartment for establishing the status of the electrical lock (locked/unlocked) or the status of the door (opened/closed) or whether the compartment is empty or full. The powering of the sensors as well as the measurements performed by the sensors are provided via the sensors input/output ports (I/O) 223 of the locking module. A visual indicator 224*n*, such as light emitting diode (LED), may be attached onto each compartment and controlled by the processor, for example for indicating which compartment should be used for depositing or for picking-up a parcel. Powering of the indicators is provided via the indicators input/output ports (I/O) 225 of the locking module. Preferably, when a door is unlocked, the door automatically opens, thanks for example to a spring mechanism, and therefore indicates which compartment should be used without any need for a visual indicator. Although the system is designed to be operated with a mobile device such as a smartphone by a parcel recipient, a lock interface 226, such as a pin-pad or another interface known in the art, is also provided for a parcel recipient who does not possess a mobile device, so that he can access a compartment by entering his authorization code with the lock interface. A compartment identifier such as a number may be attached on a visible part of each compartment, for example on the door, so that a user may identify a particular compartment. Thus, a recipient who does not possess a mobile device, may identify the compartment from which he needs to pick-up a parcel and the associated lock interface located near the compartment. Alternatively, a cluster identifier such as a number may be attached on a visible part of each compartments cluster so that a user may identify the particular compartments cluster and the associated lock interface. Thus, a recipient who does not possess a mobile device, may identify a compartments cluster from which he needs to pick-up a parcel, and use the corresponding lock interface for opening the compartment.

The locking module is powered by a power supply 228, which may be replaceable batteries or rechargeable batteries via solar panels or energy harvesting equipment or any other electrical energy supplies. In order to minimize the power consumption, an energy management module 230 manages transitions of energy modes and allows the compartments cluster 110*i* to be run in different low energy modes or different sleep modes. Each energy mode defines which peripheral or component is available and limits the amount of current consumed by the peripherals or components. For example, the energy management module may turn off or on the power of unused blocks of the volatile memory 212 or may turn off or on the radio transceiver module. The energy management module may comprise voltage regulators and timers for switching between energy modes. A non-volatile memory 240 controlled and directly accessible by the processor stores the firmware run by the processor 210 and data received from the remote shipping server via mobile devices or generated within the compartments cluster 110*i* such as operation events. The data stored in the non-volatile memory 240 comprise a cluster identification 250, which uniquely identifies the compartments cluster, a compartment index 251*n* used for indexing each compartment amongst the compartments of the compartments cluster, an events limit 252 indicating a limit of events that can be stored in the locking module, a cluster state 253 indicating the state of each compartment of the compartments cluster, a low power status 254 indicating the status of the power supply, and an events table 255 storing the events which have occurred relatively to the operations of all the compartment of the compartments cluster. Typical events, which may be stored in the events table, include change in the status of the door and new status (opened/closed) or change in the status of the lock and new status (locked/unlocked) or whether the compartment is dirtied or damaged or whether a parcel is deposited in the compartment. The events are temporarily stored in the compartments cluster before transfer to the remote shipping system via a mobile device for the remote shipping system to monitor and manage the park of compartments clusters and of parcel lockers. In order to minimize the used memory of the locking module, once an event is successfully transferred to the remote shipping system, it is deleted from the events table 255 and the events limit 252 is updated if necessary. The non-volatile memory 240 also stores a functions table 260 corresponding to all the functions, which are available for the compartments cluster operation and which can be run by the processor 210 on request by an authorized mobile device, and may store for each compartment of the compartments cluster a unique authorization code 270*n*, which may be requested from a recipient for his picking up of a parcel in the compartment, and may store a cluster broadcasting table 272.

In order to communicate with a locking module 120*i* via short distance wireless communication, a mobile device 102 also comprises a radio transceiver module equipped with an antenna controlled by a processor running an associated short distance wireless communication software. In particular, it comprises a scanning function for discovering the different compartments clusters that it may have to communicate with. Such hardware and software components are commonly available for smartphones or PDAs.

When a compartments cluster is not in use, the locking module is in a deep sleep mode, i.e. a very low energy mode so as to minimize the power consumption of the compartments cluster. In such deep sleep mode, the energy level of the compartments cluster is below 10% of the average energy consumption when the compartments cluster is awake and fully operational. Only very limited functions are available, and in particular the radio transceiver module is asleep and the locking module cannot communicate with and cannot be wakened up by a mobile device proximate to the compartments cluster. In order to allow for initiating a communication session with a mobile device, when in deep sleep mode, the locking module temporarily partially wakes-up for broadcasting short messages. This partial wake-up, corresponding to a low energy sleep mode, activates the radio transceiver module and can be controlled by the energy management module, which can comprise a low energy sleep timer 280 for triggering transitions to the sleep mode. In sleep mode, additional functionalities, compared to the deep sleep mode, is limited to sending broadcasted short messages and waiting for a response. The operation of the locking module can be controlled by a processor constituted of several processor modules comprising a high energy processor module 210A controlling high level functionalities including the communication management and the access authorization management, which is de-activated in sleep mode, and a low energy processor module 210B controlling the radio transceiver module for sending broadcasted short messages and waiting for a response, which is de-activated in deep sleep mode, and a very low energy processor module 210C for minimal control. The energy management module manages the switches between these modes and the associated energy consumption. The operation of the locking module also can be controlled by separate processors cooperating together and whose activity and energy consumption are managed by the energy management module. For example, a particular processor may control the radio transceiver module and may be specifically awakened during the sleep mode.

To minimize the power consumption, the locking module is generally maintained in a deep sleep mode. In order to allow communication with a mobile device, the low energy sleep timer 280 regularly triggers a transition from deep sleep mode to sleep mode according to a repetition time period. Once in sleep mode, the locking module sends a broadcasted short message and actively listens to a response from a mobile device during a limited listening time window. The end of the listening time window is triggered by a listening time window timer 282, which can be comprised in the the energy management module. A mobile device proximate to the compartments cluster and whose short distance communication is activated, has a scanning function for listening to broadcasted short messages from locking modules. When the mobile device captures a broadcasted short message from a locking module, and if the mobile device needs to establish a communication with this locking module, the mobile device immediately sends a response message to the locking module for establishing the communication so that the response message can be captured within the limited listening time window of the locking module.

The reception by the radio transceiver module of a response message from the mobile device triggers a full wake-up of the locking module. The energy management 230 activates the processor high level functionalities by activating the high energy processor module controlling high level functionalities or by activating the corresponding processor in case of an architecture with separate processors cooperating together. For establishing a communication with the mobile device, a full wake-up of the locking module is required as in sleep mode the locking module cannot perform an authorization for a communication session with the mobile device and cannot complete the establishment of a communication. Once the communication is established, the mobile device then behaves as a client initiating requests and commands, and accepting responses from the locking modules. The locking module behaves as a server receiving requests and commands, and performing requested actions and returning responses. For improving the efficiency of the broadcasted short messages and the capture rate of the response messages, several wavelength channels may be used for exchanges between a mobile device and a locking module. Using several channels is particularly useful when some channels happen to interfere with some other local emissions or even to be blocked by the environment.

If no response from a mobile device to the broadcasted short message is captured by the radio transceiver module within the limited listening time window, the listening time window timer 282 triggers the end of the sleep mode and the energy management 230 manages a return to the deep sleep mode and de-activates the radio transceiver module and the low energy processor module.

In order to minimize the power consumption of the locking module, the listening time window must be minimized, and the repetition time period must be maximized. However, these adjustments are limited by the need for establishing a communication session quickly enough for not impacting the user experience, therefore requiring a long enough listening time window and a short enough repetition time period. In parallel, in order to minimize the power consumption, the power emission of the radio transceiver module 216 and antenna 218 of the locking module also may be minimized as well as the number of wavelength channels as the energy consumption increases with the number of channels. However, the power emission of the locking module and/or the number of channels must be sufficient, depending on the environment conditions, for a mobile device to capture broadcasted short messages from the locking module and to establish a communication session within at least ten (10) meters from a parcel locker.

In addition, the parcel locker system needs to ensure that broadcasted short messages coming from a multiplicity of locking modules can be captured in parallel by a mobile device and that communication sessions can be established in parallel by several mobile devices. Optimization of a broadcasting configuration (repetition time period, listening time window, number of channels, power emission) has been carried out in the case of Bluetooth type short distance communication. For a standard parcel locker configuration with 20 compartments clusters, the optimized broadcasting configuration corresponds to a repetition time period of 250 ms within a range +/−100 ms, a listening time window of 10 ms within a range +20 ms/−0 ms, a number of channels of two (3) or three (3), preferably three (3) within a wavelength range: 2402-2480 MHz, and a power emission of 0 dBm within a range +4 dBm/−0 dBm.

The optimized broadcasting configuration depends on the compartments cluster configuration of a parcel locker. Therefore, a broadcasting configuration is attached to each parcel locker configuration and is stored in the database system 130 of the remote shipping server. Based on a parcel locker configuration, a cluster broadcasting table 138*i* is defined and stored in the database system 130 for each compartments cluster of the parcel locker. Each cluster broadcasting table may be regularly communicated to the corresponding compartments cluster to ensure for an optimized broadcasting setting depending on the evolving configuration and environment, and stored in the cluster broadcasting table 272 in the non-volatile memory of the locking module. For example, each time a carrier agent mobile device establishes a connection with a compartments cluster, and if the cluster broadcasting table 272 needs to be updated for that compartments cluster, the cluster broadcasting table 138*i* is communicated by the remote shipping server to the mobile device as part of the parcel locker configuration, and the mobile device communicates the cluster broadcasting table to the locking module of the compartments cluster for update. For complex parcel locker configurations or more difficult environment, each cluster broadcasting table may have to be set specifically. For simpler situations, all cluster broadcasting tables of the same parcel locker may be identical. Preferably, a MPL application provides access for carrier agents or site owners to a wizard sub-program for adjusting the broadcasting parameters and setting them so that they may also be communicated to the remote shipping server.

A broadcasted short message emitted by a compartments cluster and captured by a mobile device comprises a unique cluster identification 250, which is used by the mobile device for identifying the compartment, and which is then integrated in the response message of the mobile device to the locking module of the compartment for establishing a communication session. In order to further minimize the power consumption of locking modules, the broadcasted short message also comprises some status information relative to the compartments cluster so that based on this status information further actions or communication may be avoided or may be minimized. The locking module firmware run on the processor 210 is configured for preparing a broadcasted short message, which comprises the following status information:

the events limit 252 indicating that the limit of events stored in the non-volatile memory 240 has been reached—meaning typically that the limit of the memory space allocated for events in the non-volatile memory 240 has been reached, and therefore a parcel deposit, for example, should not be initiated with the particular locking module until some of the events may have been cleared, i.e. typically successfully transferred to the remote shipping server, the cluster state 253 defining in particular whether each compartment of the compartments cluster is empty or full, and therefore indicating whether a parcel can be deposited or not in the compartment, the low power status 254 so that no specific connection or request is required to obtain the low power status.

The status information is provided to the mobile device for preventing the mobile device initiating some actions, which may compromise the operation of the locking module or may not be completed. For example, if a low power status has been reached, interacting with the locking module before the power supply has been replenished may completely drain the power supply resulting in an uncompleted action and a compromised locking module condition. Preferably, in order to minimize the size of the status information, the events limit and the low power status are both single bits. The compartment state is a concatenation of bits, each bit corresponding to Boolean states such as empty/full compartment or opened/closed door or locked/unlocked compartment.

The status information of a broadcasted short message is prepared while the locking module is fully awake. The broadcasted short message can then be stored in a specific register for easy access and broadcasting when the locking module is in sleep mode. The broadcasted short message is limited in size in order to ease its handling and minimize the resources and energy required for the locking module to send it.

When a mobile device receives a broadcasted short message from a particular compartments cluster, the mobile device may need to establish a communication session with that particular compartments cluster for example to transfer to the remote shipping system events stored in the compartments cluster or to deposit a parcel into a compartment of the compartments cluster or to pick-up a parcel from a compartment of the compartments cluster. To prevent any communication and eventually any access to the compartments cluster from an unauthorized device, an authenticator, preferably unique, must be provided as part of a request from the mobile device for establishing a communication session, and this authenticator is checked by the locking module of the compartments cluster for authorizing the establishment of a communication session.

The authenticator includes or is sent with the unique cluster identification, which is checked by the locking module for ensuring that the request is addressed to an appropriate compartments cluster, and includes a compartment index identifying a compartment associated with the communication session being established (for example for a deposit in that particular compartment or a pick-up from that particular compartment). The request from the mobile device for establishing a communication session may be received by other compartments clusters, but will be rejected as there is no match on the cluster identification. Once a communication session is authorized by the compartments cluster with the mobile device, any request from any other mobile device is rejected. During the communication session, any request from the mobile device to the compartments cluster may need to include the authenticator. The authenticator is generated by the remote shipping system and is provided to the mobile device by the remote shipping system.

The authenticator also includes a privileges mask, which identifies, amongst all available functions within the functions table 260, the functions that are authorized. The generation of a privileges mask by the remote shipping system depends on the user and in particular on the user category. The remote shipping system then provides the privileges mask to the mobile device within the authenticator. The privileges mask, as well as the authenticator, is generated by the remote shipping system following on a login of the user into the MPL application, which is installed on his mobile device for interacting with the parcel locker compartments, and which automatically requests an authenticator from the remote shipping system. Following on the establishment of a communication session, the privileges mask received by the compartments cluster is used for the compartments cluster to provide access to the functions, which are authorized for the particular user. The privileges mask may be stored in volatile memory and addressed by the firmware run by the locking module for checking on the functions authorized for the particular user. In order to minimize the size of the privileges mask and therefore participate in minimizing the data volume exchanged with the locking module, the privileges mask consists in a series of bits, preferably a 32 or 64 bit series, where each bit corresponds to a particular function of the functions table 260. The bit value indicates whether the function is authorized or not authorized. For example, a bit set at 1 may indicate that the function is authorized and a bit set at 0 may indicate that the function is not authorized. Such a format for the privileges mask allows for a compression of information and for a convenient inclusion of the privileges mask into the authenticator, which prevents the need for additional communication between the compartments cluster and the mobile device to define the authorized functions. For prior art parcel lockers, which are operated by different categories of users requiring access to different functions of the parcel lockers, roles are typically pre-defined and stored in the parcel lockers. A particular role is attached to each user, and when a user establishes a communication or an access with a parcel locker, the role attached to the user is provided to the parcel locker. As a result, when some function access must be changed and therefore the corresponding roles must be changed, these roles need to be updated and stored in all the parcel lockers before any new communication can be established between users and the parcel lockers. Roles updates can be performed by downloads from remote servers via long distance communication. But when no long distance communication is available as addressed by the invention, the usage of a privileges mask is a major benefit because no roles update is then required for the locking modules. Additionally, the usage of a privileges mask in the form of a series of bits makes the locking module operation particularly efficient as no interpretation of string requests is required from the locking module, which would typically be the case for example if a role attached to a user is provided to a compartments cluster when the user initiates a communication or access with the compartments compartment.

As opposed to prior art parcel lockers, which include a central control unit monitoring and storing the status of the different compartments of the parcel locker and which controls the different compartments, a parcel locker of the invention constituted of autonomous compartments does not include any central control unit. In the parcel locker system of the invention, the monitoring and the storing of the status of the compartments is performed by the remote shipping server, which delegates the local control of the compartments to the MPL application. When a parcel deposit into a parcel locker of the invention is initiated by a carrier agent, the PL configuration is provided by the shipping remote server to the carrier agent MPL application. The PL configuration includes all cluster identifications and parcel identifications of parcels deposited in compartments of the parcel locker. The PL configuration is essential for a user to be able to operate the parcel locker via his mobile device, for example, for a carrier agent to be able to select in which compartment a parcel can be deposited. Preferably, the PL configuration is requested by the MPL application to the remote shipping server following on the reception by the mobile device of a first broadcasted short message from a compartments cluster.

Based on the unique cluster identification 250 comprised in the broadcasted short message and transferred to the remote shipping server within the PL configuration request, the remote shipping server identifies within its database system 130 the corresponding parcel locker and provides the PL configuration to the mobile device. Once the PL configuration is received by the mobile device, a compartment available for deposit can be identified by the MPL application and a communication session can be established by the mobile device with a compartments cluster comprising that compartment for the deposit of a parcel. The compartment availability is established based on the cluster status table 136i included in the PL configuration provided by the remote shipping server as whether a parcel identification is associated with a compartment of the compartments cluster—i.e. associated with a compartment identification. Based on the events limit 252 received from a compartments cluster with a broadcasted short message, the MPL application establishes that a PL configuration update may be required. In an alternative embodiment, the PL configuration is received from the remote shipping server before the carrier agent arrives near the parcel locker and the parcel deposit can start before broadcasted short messages are received by the mobile device from all the compartments clusters of the parcel locker, therefore minimizing delays for the carrier agent.

Based on the PL configuration, the MPL application also can establish the number of compartments clusters, which constitute the parcel locker, and can check that a broadcasted short message is received from all the compartments clusters of the parcel locker. The efficiency of parcels deposit by a carrier agent depends on the accuracy of the PL configuration provided by the remote shipping server. It is therefore important that events relative to the compartments of a parcel locker be transferred as soon as possible to the remote shipping server. Preferably, events are transferred as part of any user operation on the parcel locker via the mobile device of the user. However, some parcel recipients may pick-up their parcel without using a mobile device or some operations may not allow for the transfer of events to a mobile device. So, any event relative to a compartments cluster, either during a user operation such as a deposit or during a compartments cluster internal operation such as a low power status, is stored in the events table 255 so that it may be transferred to the remote shipping server via any mobile device performing an events upload towards the remote shipping server.

An aspect of the invention is that the parcel locker system of the invention allows for the establishment of an asynchronous bidirectional multi-channel communication between the remote shipping server and the compartments clusters of the park of parcel lockers, where the multiple mobile devices constitute a multi-channel network. As described above, an asynchronous communication is established in the direction of the remote shipping server from a compartments cluster via a mobile device following on the establishment of a communication session between the mobile device and the compartments cluster, for example to transfer data such as events from the compartments cluster to the remote shipping server. The mobile device temporarily stores the data until their transfer to the remote shipping server can be completed. This transfer can be performed via any mobile device with an installed and activated MPL application for operating parcel lockers so that the data may be uploaded via the first mobile device, which establishes a communication with the compartments cluster. In the other direction, the remote shipping server communicates to a compartments cluster via a mobile device either data such as authorization codes or instructions such as for blocking the operation of a compartment. The data or requests are temporarily stored in the mobile device until their transfer to the compartments cluster can be completed. This asynchronous communication can be carried out via any mobile device with an installed and activated MPL application.

Preferably, the remote shipping server selects some preferred mobile devices for communicating with a compartments cluster according to preset rules. A preset rule may be that a communication from the remote shipping server to a particular compartments cluster is addressed only to mobile devices, which are making requests to the remote shipping system regarding the particular compartments cluster such as for a coming up deposit of parcels. Such a rule ensures that communications from the remote shipping server are channeled only through mobile devices, which are most likely to establish a communication with the particular compartments cluster. The bidirectional communication may be established based on web socket technology. According to the invention, the mobile devices with an installed MPL application for operating the parcel lockers constitute a multichannel asynchronous network for communicating between the remote shipping system and a compartments cluster, therefore optimizing the efficiency of the communication while the invention also allows for parcel lockers to be operated in areas not covered by long distance wireless communication. Data or requests from the remote shipping system may be communicated to and temporarily stored in a mobile device before entering the area not covered by long distance wireless communication, and data from compartments clusters may be temporarily stored in a mobile device until the mobile device exits the area not covered by long distance wireless communication to complete the transfer to the remote shipping system.

The system is designed to be operated by a parcel recipient either with a mobile device such as a smartphone or without a mobile device as some parcel recipients may not possess or may not want to use a mobile device for operating a compartment. A parcel recipient may also possess a mobile device, which does not carry a short distance wireless communication capability, or may not want to activate it. It is therefore necessary that the parcel locker system of the invention can be operated by a parcel recipient both remotely with a mobile device and manually for example with a lock interface such as a pin-pad for entering a unique authorization code. However, automatically accessing the parcel locker with a mobile device is a primary objective of the invention, while manually accessing the parcel locker is a palliative procedure. Operating the parcel locker with a mobile device provides a superior user experience as entering an authorization code is not required. In this preferred mode object of the invention, access authorization by a compartments cluster is given by checking the authenticator automatically provided by the recipient mobile device and initially generated by the remote shipping system.

In order to support the palliative procedure for manual access, an authorization code is systematically provided to each recipient. For security reason, the authorization code provided to the recipient for picking-up a parcel is preferably a one-time authorization code, uniquely associated with the particular parcel to be picked-up, so that this one-time authorization code cannot be used again. One-time authorization codes are generated and managed by the remote shipping system. For each parcel to be picked-up from a compartment, a one-time authorization code needs to be provided to a compartments cluster comprising that compartment before the recipient comes for picking-up his parcel. In an embodiment, the authorization code is requested by the carrier agent MPL application at the time of the parcel delivery by a carrier agent after the parcel for deposit has been identified, for example by scanning a parcel identification attached onto the parcel. Alternatively, in another embodiment, the authorization code is generated beforehand by the remote shipping server and communicated to the MPL application for temporary storage before or when the carrier agent plans for his daily delivery into parcel lockers. Therefore, the carrier agent can operate the parcel locker even if he stands in an area not covered by long distance wireless communication.

Upon receiving a request for an authorization code, the remote shipping system generates the authorization code, which is temporarily duplicated into the mobile device. Once the parcel is deposited, the authorization code is transferred from the mobile device to the compartments cluster and associated with the compartment (i.e. compartment index) of the compartments cluster where the parcel has been deposited and the remote shipping server is informed of the deposit via the upload of the compartments cluster events. Then, the remote shipping server notifies the recipient for example via a SMS or an email that he has to pick-up a parcel. If the recipient does not have a MPL application installed, the notification provides the recipient with the parcel locker location and with the compartment identifier 140j and with the authorization code that he needs to enter for opening the compartment. If the recipient has installed the MPL application, the notification only informs the recipient of the parcel locker location and reminds him that he should use the MPL application for opening the compartment.

More generally, the benefit of operating a parcel locker with a mobile device also applies to any user including site owners or carrier agents. Access authorization by a compartments cluster is given by checking the authenticator automatically provided by the user mobile device and initially generated by the remote shipping system, thus replacing a manual authorization entry for example via a keypad or via a barcode scanning.

In addition to responding to the needs for a new generation of parcel lockers as described previously, the autonomous compartments clusters of the invention provide additional benefits. If a compartments cluster locking module malfunctions, and in particular cannot communicate anymore, all the other compartments clusters can continue to be operated and can communicate, unlike with prior art parcel lockers where a malfunctioning central control unit would block the operation of the whole parcel locker and would require immediate intervention. For the parcel locker of the invention, a simple swap of the malfunctioning compartments cluster could be performed at the most appropriate time. Another user benefit of the invention is that each user operates the compartments clusters of the invention with his own mobile device therefore allowing several users to access several compartments clusters in parallel. During busy periods, several recipients may pick-up their parcels in parallel or even carrier agents and recipients may interact in parallel with the parcel locker compartments clusters. Such parallel operations are made possible by the system architecture of the invention providing locking modules, which broadcast short messages, which store operation events and which update the PL configuration information of mobile devices and of the remote shipping system.

Figure 3:
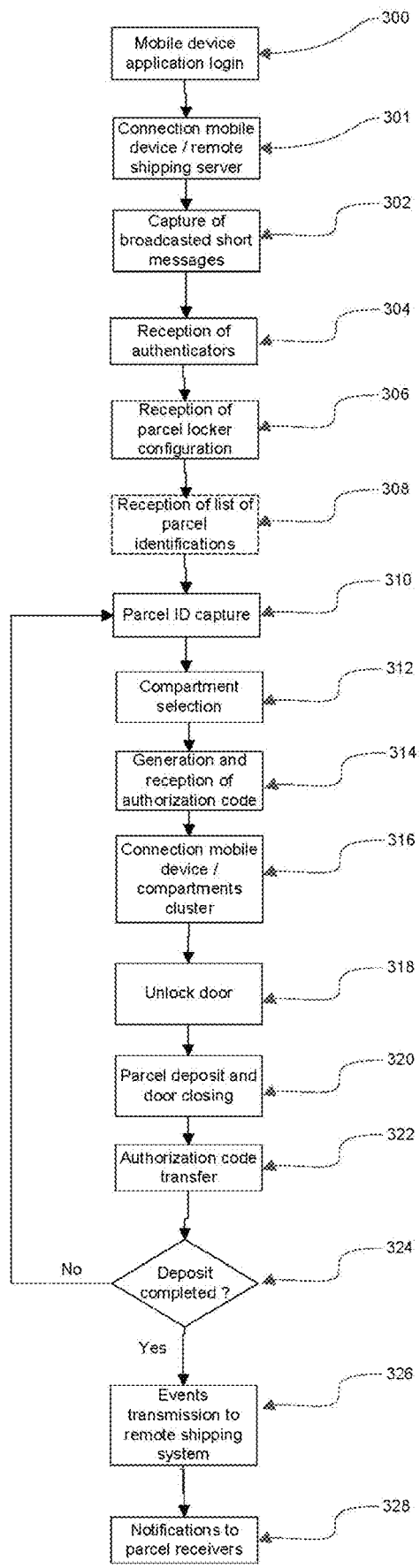
FIG. 3 illustrates a process according to an embodiment of the invention for depositing parcels by a carrier agent according to an embodiment of the invention.

FIG. 3 illustrates an embodiment of the invention for parcel deposit by a carrier agent. When a group of parcels is planned to be deposited in a particular parcel locker 100, the deposit task is assigned to a carrier agent. To carry out the deposit, the carrier agent uses a mobile device 102 and has to access a MPL application for operating parcel lockers. Preferably, the carrier agent must perform a login for accessing the MPL application (step 300). The login can be performed via any means known in the art such as an identifier entry via the mobile device interface (for example by keying the identifier on the keypad or touchscreen of the mobile device), an identification barcode reading by the mobile device or an identification capture by the mobile device via imaging or biometry technology or radio frequency technology. Alternatively, as part of a single sign on scheme, the login for accessing the MPL application may be combined with the login of a general carrier software running on the mobile device for managing the overall activity of the carrier agent, for example when the MPL application is integrated in such a general carrier software. The login for accessing the MPL application may also be combined with the login of the mobile device, for example when the mobile device is dedicated for a carrier agent activity. Following on the carrier agent login, in step 301, the MPL application initiates a communication with a remote shipping server 106 and provides the user credentials. The MPL application may also automatically activate the short distance communication in anticipation for establishing a communication with parcel locker compartments clusters. After a positive check on the carrier agent credentials, the remote shipping server authorizes the communication and a secured communication is established between the mobile device and the remote shipping server.

When the carrier agent arrives near the parcel locker, the mobile device starts capturing broadcasted short messages from compartments clusters of the parcel locker (step 302). After a first capture of a broadcasted short message, which includes a unique cluster identification 250, the MPL application requests from the remote shipping system data for performing the deposit including in particular authenticators for establishing the communication with compartments clusters. Based on the unique cluster identification 250, the remote shipping system can identify the corresponding parcel locker for returning the appropriate data and a check may be performed on whether the carrier agent is in front of the appropriate parcel locker. The remote shipping system generates a preferably unique authenticator for each compartment of the parcel locker and provides these authenticators to the MPL application so that the mobile phone may establish a communication with each compartments cluster. Each authenticator includes or is sent with an unique cluster identification 134i, which is retrieved from the PL configuration stored in a database system 130 of the remote shipping system, and also includes a privileges mask, which is generated by remote shipping system based on the user credentials and on the user category (step 304). Based on the unique cluster identification 250, the remote shipping system also provides the mobile device with the PL configuration, which comprises in particular for each compartments cluster a cluster identification and a cluster status table 136i and for each compartment a compartment identification and a compartment size 142j (step 306). In parallel, the remote shipping server may have requested or may have received from the carrier system an announcement regarding the parcels, which should be deposited in that parcel locker. Based on this announcement, the remote shipping system may also provide a list of identifications corresponding to the parcels to be deposited in the parcel locker (step 308). In an alternative embodiment, authenticators and PL configuration may be provided to the MPL application before the carrier agent arrives near the parcel locker, for example in the case of computerized planned deliveries, so that no transmission delay may impact the delivery process in front of the parcel locker. When receiving a first broadcasted short message, the MPL application may check for a match between the unique cluster identification 250 comprised in the broadcasted short message and the cluster identification 134i of a PL configuration received from the remote shipping system, where it is stored in the database system 130.

In step 310, the carrier agent captures a parcel identification attached to a parcel to be deposited in the parcel locker 100 with his mobile device 102, for example by scanning the parcel identification barcode printed on the parcel or by reading a radio frequency signal emitted by a tag affixed onto the parcel via for example RFID technology or NFC technology or eventually by entering manually the parcel identification. The size of the parcel may be captured at the same time as the parcel identification or may need to be entered separately. Following on the successful capture by the mobile device 102 of the parcel identification, the mobile device 102 may check for a match between the parcel identification captured by the mobile device 102 and the list of identifications of the parcels to be deposited, therefore ensuring that the parcel is actually required to be deposited in the parcel locker. In step 312, based on the PL configuration, the MPL application selects in which compartment the parcel can be deposited, according to preset rules including at least the following: the compartment is empty and the compartment size matches the parcel size. Other rules for selecting a compartment for deposit may include a rotation rule amongst the compartments for ensuring a homogeneous usage of the compartments in order to apportion the power consumption or to prevent the early wear of any particular compartment. The rotation may be planned by the remote shipping server based on the level of the remaining energy for the different compartments clusters of a parcel locker—level of the remaining energy, which may be communicated by each locking module via the mobile devices. Following on the compartment selection, the MPL application requests from the remote shipping server a unique authorization code, which will be uniquely associated with the parcel and the compartment. The authorization code is generated by the remote shipping server and communicated to the MPL application for temporary storage (step 314). Alternatively, authorization codes for all the parcels to be deposited in the parcel locker are generated beforehand by the remote shipping server and communicated to the MPL application for temporary storage before or when the carrier agent plans for his daily delivery into parcel lockers. Eventually, authorization codes can be generated immediately after a recipient registers for a parcel shipment and an unique parcel identification is associated with that parcel. Therefore, the carrier agent arrives near the parcel locker with the authorization codes already stored in his mobile device, and he can operate the parcel locker even if he stands in an area not covered by long distance wireless communication.

As soon as the mobile device receives a broadcasted short message from the compartments cluster of the selected compartment (identified by the unique cluster identification 250 included in the broadcasted short message), the mobile device sends a response message to the compartments cluster for establishing a communication so that the response message can be captured within the limited listening time window of the locking module. The response message includes the authenticator provided by the remote shipping server and associated with the compartment where the deposit needs to take place. When the response message is received by the locking module, the locking module fully wakes-up and an authentication is performed according to the short distance wireless protocol. As part of the authorization process for the locking module to authorize the mobile device to establish the communication, the locking module verifies the validity of the received authenticator and checks on the unique cluster identification included in or sent with the authenticator by comparing this unique cluster identification with the cluster identification 250 stored in the non-volatile memory 240 (step 316). Once the communication between the locking module and the mobile device is established, the locking module stops broadcasting short messages, but the mobile device continues listening to other compartments clusters and may capture broadcasted short messages including some status information, which had not been captured yet. Thereby, the mobile device may in parallel update its information regarding the PL configuration, eventually by initiating some requests for events stored in some compartments clusters.

In step 318, the mobile device sends a request for unlocking the door of the selected compartment and which includes the authenticator. After validating the requested unlocking action based on the privileges mask included in the authenticator, the locking module unlocks the compartment door. The locking module may activate a visual indicator 224n such as a LED for indicating which door should be opened for depositing the parcel, in case no mechanism is comprised with the door for an automatic opening. In step 320, the carrier agent deposits the parcel in the compartment and closes the door—event which is detected by a sensor 222n and stored in an events table 255 of the compartment locking module. Preferably, the carrier agent is required to confirm the deposit before the mobile device requests the locking of the compartment door, therefore ensuring that the parcel deposit has actually occurred. Alternatively, the mobile device automatically requests the locking module to lock the door or the locking module automatically locks the door. After validating the requested action based on the privileges mask included in the authenticator, the locking module locks the compartment door. Then, in step 322, the mobile device requests for the transfer of the unique authorization code uniquely associated with the parcel and which was generated by the remote shipping server. After validating the requested transfer action based on the privileges mask included in the authenticator, the locking module stores the unique authorization code 270n in the non-volatile memory 240, and the communication between the mobile and the compartments cluster is disconnected and the locking module of the compartments cluster resumes broadcasting short messages. As long as some parcels remain for deposit, the carrier agent proceeds with step 310 (capture of a parcel identification) and proceeds with the following steps up to step 322 (step 324). Based on the list of identifications of the parcels to be deposited in the parcel locker, the MPL application may define whether the deposit process is completed by comparing the parcel identifications, which have been captured in step 310, with the list of identifications of parcels for deposit.

In a preferred embodiment, immediately following on an event occurring within a compartment, the locking module of the compartments cluster stores the event in an events table 255. During the deposit process, other requests may be sent by the mobile device to the compartments clusters such as the transfer of events stored in the locking modules. Preferably, the transfer of the events stored in the compartments clusters is performed during the deposit process in order to avoid or minimize any waiting time for the carrier agent at the end of the deposit for transferring the events from the compartments clusters to the mobile device, and avoid an early departure of the carrier agent before the transfer of events is completed. These events stored in the different compartments are consolidated by the mobile device into a deposit event report reflecting the deposit performed by the carrier agent. This deposit event report also consolidates events reflecting additional actions performed by the carrier agent with the mobile device. Once the deposit process is completed or the carrier agent has indicated via the interface of the mobile device 102 that he wanted to stop the deposit process, the communication between the mobile device and the latest compartments cluster is disconnected. As soon as the communication between the mobile device 102 and the remote shipping system 106 is established, if this communication was disconnected, the mobile device transmits to the remote shipping system the deposit event report consolidating all events collected from the locking module of the parcel locker and the events reflecting additional actions performed by the carrier agent with the mobile device (step 326). Once the events are received by the remote shipping system, the remote shipping system generates a notification for each recipient of parcel, which has been deposited in the parcel locker, informing him of the deposit and providing him with information for picking-up the parcel (step 328). The recipient authorization codes may be provided only to the recipients who have not downloaded the MPL application as the recipients having downloaded the MPL application can use their mobile device for picking-up their parcel. During the whole deposit process, the mobile device screen may serve as man machine interface for informing and guiding the carrier agent for operating the compartments, for example in case all compartments are utilized and no more deposit is possible.

Figure 4:
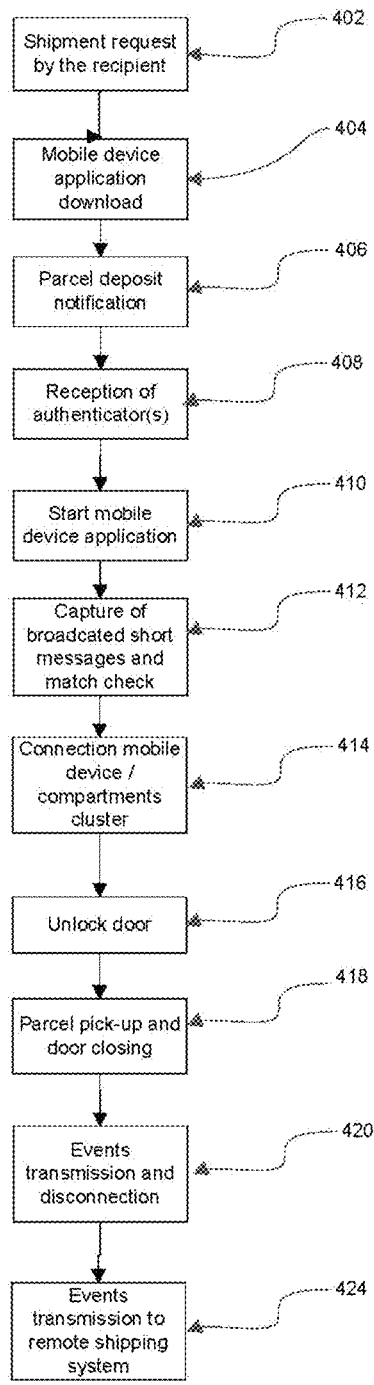
FIG. 4 illustrates a process according to an embodiment of the invention for picking-up parcels by a recipient using his mobile device for operating a compartment.
Figure 5:
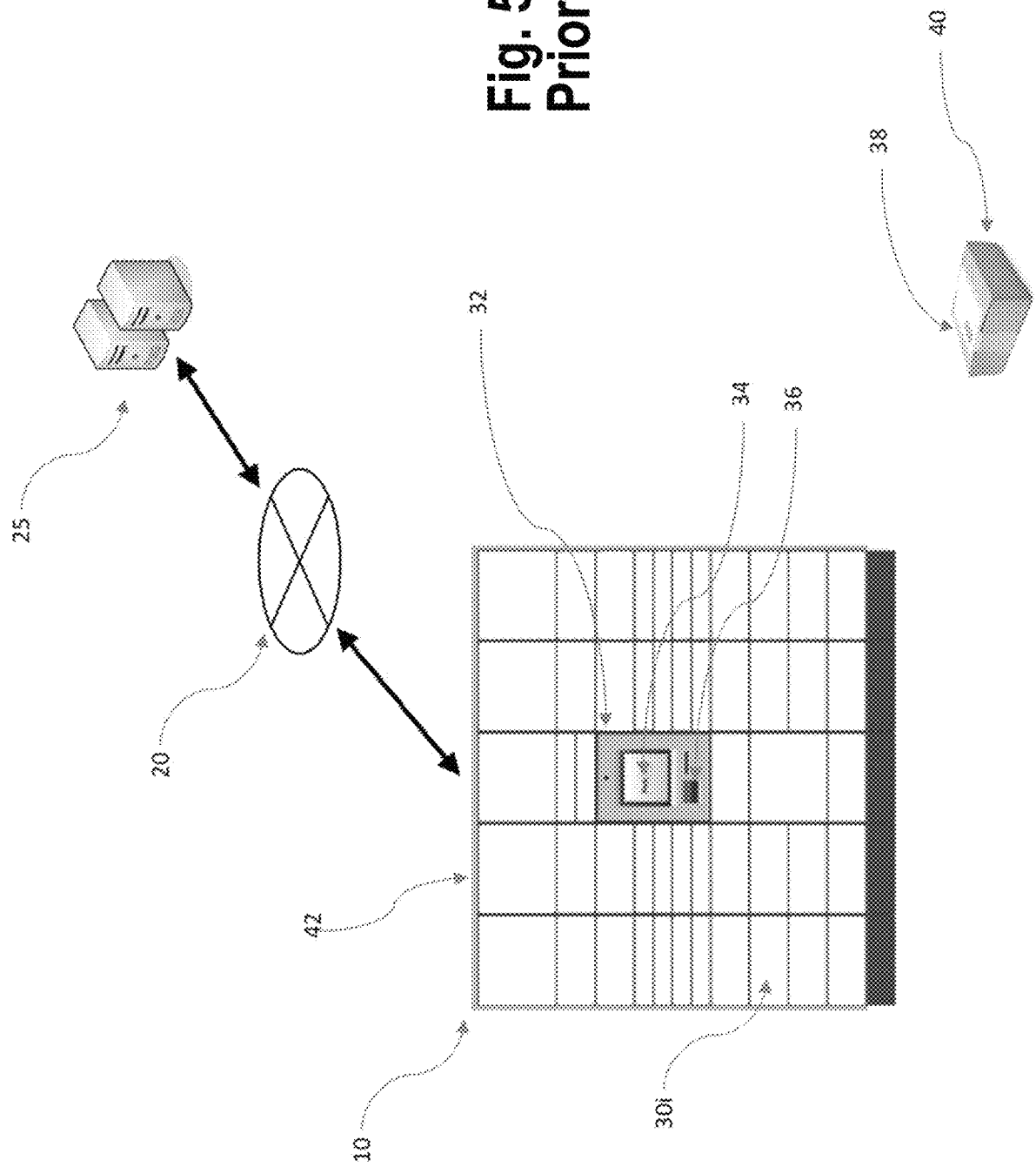
FIG. 5 illustrates the prior art electronic parcel locker system.

FIG. 4 illustrates an embodiment of the invention for parcel pick-up by a recipient using his mobile device for operating a compartment. When a recipient makes a request for a shipment, typically via a computer system, this request is logged into a remote shipping system 106 (step 402). When the recipient chooses that the shipment be delivered in a parcel locker 100, the remote shipping system may inform the recipient that a MPL application should be downloaded onto his recipient mobile device 102 in case such a MPL application has not been downloaded yet onto his mobile device. If agreed by the recipient, the remote shipping system then may download the MPL application onto the recipient mobile device or for many standard operating systems for mobile devices, the recipient may be requested and guided to use an associated application store, for example Apps Store™ or Google Play™, for downloading the MPL application onto his mobile device (step 404).

After the shipment, i.e. the parcel, is deposited in a compartment 112j of the parcel locker, the remote shipping system sends at least one notification to the recipient in the form of an email or an SMS for informing the recipient of the parcel deposit and of the location of the parcel locker and including the parcel identification (step 406). If the recipient has not downloaded the MPL application, the notification comprises an authorization code that the recipient needs to enter for opening the compartment and a compartment identifier corresponding to a physical identifier attached on a visible part of the compartment so that the recipient may identify the compartment where his parcel is deposited. The notification may also propose the download of the MPL application for example via a Uniform Resource Locator (URL). If the recipient has installed the MPL application, the notification only reminds him that he should use the MPL application for opening the compartment. In step 408, in a preferred embodiment, the reception by the MPL application of an authenticator for the parcel pick-up is initiated during the notification process. The notification received on the mobile device may include a function, for example a URL eventually in the form of a button, designed for transferring the authenticator to the MPL application. When the recipient activates the function, for example by touching the area of the mobile phone display representing the function, a navigator installed on the mobile phone is launched for accessing a web application hosted on the remote shipping server and a parcel identification associated with the notification is sent to the web application. The web application remotely starts the MPL application, which requests from the remote shipping system an authenticator for the pick-up of the parcel. Based on the parcel identification, the remote shipping system can identify the corresponding parcel locker and parcel compartment for generating a preferably unique authenticator, which is uniquely associated with the compartments cluster where the parcel is deposited and which can be used by the mobile phone for establishing a communication with the compartments cluster. This particular notification procedure with the function pointing to the web application allows for a separation of the management of the recipients, for example handled by the carrier organization, and the management of the parcel lockers, for example handle by a service company, which may not know specifically about the recipients. The generated authenticator includes or is sent with a unique cluster identification 134$i$, which is retrieved from the PL configuration stored in a database system 130 of the remote shipping system, and also includes a privileges mask, which is generated by the remote shipping system based on the user credentials and on the category of the user, who is identified as a recipient. The remote shipping system returns the authenticator to the PML application, where it is stored for a future pick-up of the parcel. In case several parcels are due to be picked-up by the recipient, the remote shipping system generates and returns for each parcel a preferably unique authenticator including or sent with a unique cluster identification. Alternatively, for an integrated system, data including the authenticator are encapsulated within the function, preferably in an encrypted form, and, when the recipient activates the function, the data are transferred to the MPL application. In this case, the authenticator and the privileges mask are generated beforehand by the remote shipping system where recipient data and parcel locker data are jointly managed in an integrated manner.

When the recipient arrives near the parcel locker, he starts the MPL application on his mobile device 102, and, if the short distance communication is not activated yet, it is automatically turned on (step 410). In case an authenticator has not been received by the mobile phone for the pick-up of the parcel, the MPL application may provide the recipient's credentials, preferably his mobile device phone number, to the remote shipping system and may request an authenticator for establishing communication with a locking module 120$i$ of the compartments cluster where his parcel has been deposited. Based on the recipient's credentials, the remote shipping system can identify the corresponding parcel and compartments cluster for generating and returning an authenticator, which is uniquely associated with the compartments cluster and which can be used by the mobile phone for establishing a communication with the compartments cluster. The authenticator includes or is sent with a unique cluster identification 134$i$, which is retrieved from the PL configuration stored in a database system 130 of the remote shipping system, and also includes a privileges mask, which is generated by the remote shipping system based on the user credentials and on the user category.

In step 412, the mobile device starts capturing broadcasted short messages from compartments clusters of the parcel locker. Each broadcasted short message includes a unique cluster identification 250 identifying the corresponding compartments cluster. For each received broadcasted short message, the MPL application checks for a match between the unique cluster identification 134$i$ received from the remote shipping system (or at least one of the unique cluster identifications, if several parcels are due to be picked-up by the recipient) and the unique cluster identification 250 received from the compartments cluster for identifying which compartments cluster contains the recipient's parcel. As soon as the mobile device obtains a match for a particular compartments cluster, the mobile device sends a response message to the compartments cluster for establishing a communication so that the response message can be captured within the limited listening time window of the locking module. The response includes the authenticator provided by the remote shipping server and corresponding to the compartments cluster. When the response message is received by the locking module, the locking module fully wakes-up and an authentication is performed according to the short distance wireless protocol. As part of the authorization process for the locking module to authorize the mobile device to establish the communication, the locking module verifies the validity of the received authenticator and checks on the unique cluster identification included in or sent with the authenticator (step 414). Once the communication between the locking module and the mobile device is established, the locking module stops broadcasting short messages.

In step 416, the mobile device sends a request for unlocking the compartment door, request which includes the authenticator. After validating the requested action based on the privileges mask included in the authenticator, the locking module unlocks the compartment door based on the compartment index included in the authenticator. The locking module may activate a visual indicator such as an LED for indicating which door should be opened for depositing the parcel, in case no mechanism is comprised with the door for an automatic opening. In step 418, the recipient retrieves his parcel from the compartment and closes the door—event which is detected by a sensor 222$n$ and stored in an events table 255 of the compartments cluster locking module—and the locking module locks the door of the compartment. During the pick-up process, the locking module of the compartments cluster stores an event in an events table 255 preferably immediately following on the occurrence of the event within a compartment. Following on the confirmation to the mobile device by the locking module of the door locking, the mobile device requests events stored in the non-volatile memory 240 of the locking module for transferring them to the remote shipping server. In order to secure the transfer of information via an untrusted mobile device, the locking module may encrypt the events before transferring them to the mobile device. After the transfer of the events, the communication between the mobile and the compartments cluster is disconnected and the locking module of the compartments cluster resumes broadcasting short messages (step 420).

The events transferred from the locking module are consolidated by the mobile device with events reflecting additional actions performed by the recipient with the mobile device into a pick-up event report reflecting the pick-up performed by the recipient. As soon as the communication between the mobile device 102 and the remote shipping system 106 is established in case this communication was disconnected, the mobile device transmits to the remote shipping system pick-up event report (step 424). If the recipient has to pick-up other parcels corresponding to other authenticators temporarily stored by the MPL application, the mobile application returns to step 412 and resumes listening to broadcasted short messages. The following steps take place if an additional parcel is deposited for the recipient in this particular parcel locker. During the pick-up process, the mobile device screen may serve as man machine interface for informing and guiding the recipient for operating the compartments. In particular, the MPL application may be configured for indicating the parcels which are due to be picked-up by the recipient including the location and the compartment identifier.

In a particular embodiment of the invention, a mobile device may be provided locally next to a parcel locker. This local mobile device may be used by all users for operating the parcel locker. It may in particular be used by parcel recipients without any smartphone or any carrier agent having a dysfunctional mobile device. The local mobile device may also be used by carrier organizations, which may not want to integrate an MPL application, either temporarily or permanently, in the mobile devices that they use for delivering parcels. An MPL application is installed in the local mobile device, eventually via a download from a remote server at the time of the on-site installation of the parcel locker, and is instantiated according to a user category when a user logs onto the local mobile device. The local mobile device may be operated in parallel with a network of mobile devices as previously described or may simple replace the network of mobile devices for some applications. In one embodiment, the local mobile device is fixedly mounted on a pedestal next to the parcel locker or on a bracket attached to a wall next to the parcel locker or directly attached onto a compartments cluster of the parcel locker. The local mobile device may be powered with similar autonomous means as the locking modules. For some applications, the local mobile device may be connected to a local electrical network when it is made available. However, the compartments clusters would remain autonomous for easily installing parcel lockers and easily swapping compartments or for easily upgrading or changing the parcel lockers configuration on site. Eventually, a local mobile device may operate several parcel lockers located in the same area. In a preferred embodiment, the local mobile device may be retro-fitted on existing parcel locker supporting short distance communication capabilities.

The parcel locker system and methods of the invention described above comprise parcel lockers constituted of autonomous compartments clusters assembled together. However, it is easily understood by those skilled in the art that, in another embodiment of the invention, a single compartments cluster may be used by itself in a standalone configuration without being assembled as part of a parcel locker or even a single compartment—i.e. a single compartments cluster comprising a single compartment—may be used by itself in a standalone configuration. Such single standalone compartments clusters or single standalone compartments may be used for home delivery or for single point delivery systems. It can also be easily understood by those skilled in the art that, in another embodiment of the invention, compartments clusters could be reduced to single compartments with their own locking modules and assembled as part of a parcel locker. Such architecture would not benefit from the cost reduction of using a single locking module for several compartments assembled into a cluster, but it would provide a more modular and more flexible solution.

The invention claimed is:

1. An electronic locker system for parcel deposit and pick-up, comprising:
at least one parcel locker comprising at least one autonomous compartments cluster including at least one compartment equipped with a door and including a locking module, which electronically controls locking and unlocking of said door and which establishes a local communication with at least one mobile device via a short distance communication, wherein said locking module comprises:
an energy management module that manages transitions of energy modes and allows said at least one autonomous compartments cluster to be run in a deep sleep mode or in a sleep mode and regularly allows a wake-up from said deep sleep mode to said sleep mode,
a radio transceiver equipped with an antenna, and
at least one processor running a firmware that, while in said sleep mode, causes said radio transceiver to regularly emit a broadcasted short message receivable by said at least one mobile device.

2. The system according claim 1, wherein several of said at least one autonomous compartments cluster are mechanically fastened together to form a column and several of said columns of said at least one autonomous compartments clusters are mechanically fastened together to form said at least one parcel locker.

3. The system according to claim 1, wherein said broadcasted short message comprises a first unique cluster identification and status information relative to said at least one autonomous compartments cluster and said status information comprises an events limit or a compartment state or a low power status wherein said at least one mobile device checks on whether a limit of events stored in the locking module has been reached and checks on said compartment state to establish whether said at least one autonomous compartment is empty or full before initiating a deposit in said at least one autonomous compartment and checks on said low power status before initiating a communication with said at least one autonomous compartment.

4. The system according to claim 1, wherein said locking module comprises a low energy sleep timer that triggers transitions from said deep sleep mode to said sleep mode and a listening time window timer that triggers an end of said sleep mode and a return to said deep sleep mode and in that said at least one processor comprises a high energy processor module, a low energy processor module and a very low energy processor module.

5. The system according to claim 1, wherein a request received from said at least one mobile device for establishing a local communication with said at least one autonomous compartments cluster via said short distance communication includes an authenticator comprising or sent with a second unique cluster identification and a compartment index wherein said firmware associates said compartment index with said at least one compartment.

6. The system according to claim 1, wherein said locking module includes a non-volatile memory that stores a functions table comprising functions available for said at least one autonomous compartments cluster and which can be run by said at least one processor and wherein an authenticator includes a privileges mask identifying functions authorized for operating said at least one autonomous compartments cluster amongst functions within said functions table wherein said privileges mask consists in a series of bits wherein a bit of said series of bits corresponds to a function of said functions table and a value of said bit indicates whether said function is authorized or not authorized, wherein said authenticator is received from a remote shipping system that receives and stores credentials of a user of said at least one parcel locker and that generated said authenticator and said privileges mask based on said credentials of said user.

7. The system according to claim 1, wherein said firmware cause said broadcasted short message to be emitted with a repetition time period of 250 ms within a range +/−100 ms, with a listening time window of 10 ms within a range +20 ms/−0 ms, with a number of channels of two (2) or of three (3), and with a power emission parameter of 0 dBm within a range +4 dBm/−0 dBm.

8. The system according to claim 1, wherein said locking module comprises a lock interface and an authorization code uniquely associated with a unique parcel identification corresponding to a parcel deposited in said at least one compartment so that a parcel recipient without a mobile device may pick-up a parcel by entering said authorization code via said lock interface wherein said locking module receives said authorization code generated by a remote shipping server via said mobile device, and further wherein said at least one mobile device is fixedly mounted next to said at least one parcel locker or directly onto said at least one parcel locker and connected to a local electrical network.

9. A method for picking-up a parcel from at least one parcel locker constituted of at least one autonomous compartments cluster including at least one compartment and including a locking module, via at least one mobile device communicating via a long distance communication network with a remote shipping system;

the method comprising:
receiving by said at least one mobile device a notification, which comprises a parcel identification and includes a functionality designed for transferring an authenticator to said at least one mobile device,
activating said functionality and transferring said parcel identification to said at least one mobile device,
accessing a web application hosted in said remote shipping system,
having, via said web application, said at least one mobile device requesting from said remote shipping system said authenticator for picking-up a parcel,
transferring said parcel identification to said remote shipping system from said at least one mobile device,
identifying by said remote shipping system said at least one parcel locker and said at least one compartment based on said parcel identification,
generating by said remote shipping system said authenticator, which is uniquely associated with said at least one compartment and which includes or is sent with a unique compartment identification stored in said remote shipping system,
transferring said authenticator to said at least one mobile device.

10. The method according to claim 9, wherein data including said authenticator are encapsulated within said functionality and, when said functionality is activated, data are transferred to said at least one mobile device.

11. The method according to claim 9, further comprising for automatic unlocking:
capturing by said at least one mobile device broadcasted short messages emitted by said at least one autonomous compartments cluster, wherein said broadcasted short message includes a first unique cluster identification,
checking by said at least one mobile device for a match between a second unique cluster identification received from said remote shipping system and said first unique cluster identification received from said at least one autonomous compartments cluster for identifying which autonomous compartments cluster contains the recipient's parcel,
sending, in case of match, by said at least one mobile device a response message to said at least one autonomous compartments cluster for establishing a communication so that said response message can be captured within a limited listening time window of said at least one autonomous compartments cluster, wherein said response message includes said authenticator provided by said remote shipping server,
validating by said at least one autonomous compartments cluster said authenticator for establishing a communication with said at least one mobile device,
sending by said at least one mobile device a request for said at least one autonomous compartments cluster to unlock said at least one compartment, and
unlocking by said at least one autonomous compartments cluster for parcel pick-up.

* * * * *